United States Patent [19]

Bertram et al.

[11] 4,044,169

[45] Aug. 23, 1977

[54] FEED ADDITIVE FOR RUMINANTS

[75] Inventors: Heidrun Bertram, Grossauheim; Rudolf Fahnenstich, Mombris; Herbert Tanner, Grossauheim, all of Germany

[73] Assignee: Duetsche Gold- und Silber-Scheideanstalt vormals Roessler, Frankfurt, Germany

[21] Appl. No.: 665,575

[22] Filed: Mar. 10, 1976

Related U.S. Application Data

[62] Division of Ser. No. 441,983, Feb. 13, 1976, Pat. No. 3,968,253.

[30] Foreign Application Priority Data

Feb. 16, 1973 Germany .............................. 2307836

[51] Int. Cl.[2] ................................................ A23K 1/22

[52] U.S. Cl. ...................................... 426/656; 426/69; 426/807

[58] Field of Search ..................... 426/2, 69, 807, 656; 424/319; 260/534 S

[56] References Cited

U.S. PATENT DOCUMENTS 3,619,200 9/1971 Ferguson et al. ...................... 426/69

FOREIGN PATENT DOCUMENTS 730,923 6/1955 United Kingdom

*Primary Examiner*—R. B. Penland

*Attorney, Agent, or Firm*—Cushman, Darby & Cushman

[57] ABSTRACT

N-hydroxymethyl methionine is incorporated in feeds for ruminants.

5 Claims, No Drawings

FEED ADDITIVE FOR RUMINANTS

This is a division of application Ser. No. 441,983 filed Feb. 13, 1976, now U.S. Pat. No. 3,968,253.

The invention is directed to the use of N-hydroxymethyl methionine in ruminant feeds.

It is known to use aminoacids as additives for mixed feeds. Thus, for example, methionine effects a considerable improvement in the quality of the protein component of a feed in which this aminoacid is not present in sufficient amount for the animal since the protein components consist of proteins poor in methionine. In this case the addition of methionine effects a considerable improvement of the growth rate and the value of the feed. This result, however, until now has only been produced with monogastric animals.

The feeding requirements for ruminants differs substantially from that of monogastric animals. It is known that ruminants have several stomachs. The first, by far the largest stomach, the rumen, contains a suitable microflora of bacteria and protozoa which decompose the added synthetic aminoacids before they become available for the animal (*J. Animal Sci. Vol.* 14 (1955), pages 132–136). Besides there are found in the rumen enzyme systems which can synthesize aminoacids from ammonia and fatty acids or carbon compounds. As has been found experimentally it is actually possible to feed ruminants without any protein if there is fed sufficient non-protein nitrogen, for example, urea and carbon compounds (*Annal. Sci. Fennicae A II, Vol.* 141 (1968), pages 3–21). For these reasons an improvement in the quality of feeds for ruminants by the addition of aminoacids is not to be expected, as is confirmed by experiments (*J. Animal Sci., Vol.* 9 (1950), page 661; *Vol.* 10 (1951), pages 439–446 and 1052; and *Vol.* 14 (1955), pages 132–136).

It has now been found that N-hydroxymethyl methionine of the formula

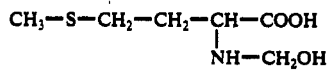

is suited for use in feeding ruminants. Surprisingly there results by the addition of this compound as a feed additive a considerable improvement, for example, in wool growth in sheep. It is advantageous to add the N-hydroxymethyl methionine as a salt, for example, as the magnesium salt or especially the calcium salt. There can also be used other non-toxic salts, e.g., the potassium and sodium salts.

The N-hydroxymethyl methionine can be prepared in known manner, for example, by reaction of methionine with formaldehyde. The salts are obtained if there are added compounds of the cations involved, especially the hydroxide, for example to recover the magnesium or calcium salt there is used magnesium or calcium hydroxide.

The N-hydroxy methyl methionine and its salts can be fed directly. Generally, however, they are used in conventional feeds or mixed feeds or with premixes such as vitamin and mineral mixtures or with feedgrade urea.

The feed as indicated can be any feed for ruminants, e.g., it can contain corn, alfalfa, grain sorghum, oat hull meal, oats, rice, rice meal, soybean meal, wheat millfeed, gluten meal, cottonseed meal, grass, hay, barley feed, barley mixed feed, distillers dried grain, peanut meal, dried and molasses beet pulp, etc.

As ruminants to which the N-hydroxymethyl methionine can be fed, there may be mentioned sheep, goats, cattle (both beef and dairy cattle) as well as deer, antelope and elk (e.g., in zoos).

The amount of N-hydroxymethyl methionine and its salts can be within a wide range. Generally, however, the amount of N-hydroxymethyl methionine or salt added to the feed based on the entire amount of feed on a dry basis supplied in one day should be about 0.01 to 5%, especially about 0.05 to 0.5% by weight.

EXAMPLE

The research animals were 12 mutton (merino sheep). As the basic feed there were added per animal per day depending on the age of the animals 800 to 1000 grams of a mixture of 10.8% grass meal, 44.9% oat hull meal, 42.9% tapioca and 1.4% of a mineral mixture for cattle as well as 100 grams of wheat straw. In a preliminary period of 5 weeks all of the animals were fed this basic feed exclusively. In a subsequent main period of 5 weeks the animals were fed separately in 3 groups of 4 animals each.

- Group I, animals 1 to 4 only basic feed
- Group II, animals 5 to 8, 4.0 grams of methionine were added daily to the basic feed.
- Group III, animals 9 to 12, 5.3 grams of the calcium salt of N-hydroxymethyl methionine were added to the basic feed.

At the end of the preliminary period and of the main period on each animal there was ascertained the wool yield compared to the cuttings before the preliminary period. The results are collected in the following Table.

TABLE

| | | Preliminary Period | | Main Period | |
|---|---|---|---|---|---|
| | | Wool Grams | Yield % of Group I | Wool Grams | Yield % of Group I |
| Group I Animal | 1. | 73.3 | | 64.4 | |
| | 2. | 62.8 | | 72.9 | |
| | 3. | 66.2 | | 64.3 | |
| | 4. | 63.9 | | 67.1 | |
| Group I Total | | 266.2 | 100 | 268.7 | 100 |
| Group II Animal | 5. | 64.2 | | 68.3 | |
| | 6. | 67.3 | | 69.5 | |
| | 7. | 71.4 | | 73.4 | |
| | 8. | 68.7 | | 69.1 | |
| Group II Total | | 271.6 | 102 | 280.3 | 104 |
| Group III Animal | 9. | 66.8 | | 84.8 | |
| | 10. | 59.5 | | 78.4 | |
| | 11. | 68.3 | | 83.7 | |
| | 12. | 65.9 | | 80.8 | |
| Group III Total | | 260.9 | 98 | 327.7 | 122 |

What is claimed is:

1. A ruminant feed containing an additive consisting essentially of N-hydroxymethyl methionine of the formula

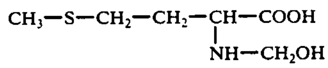

or a non-toxic salt thereof.

2. A ruminant feed according to claim 1, wherein the N-hydroxymethyl methionine or salt thereof is present in an amount of 0.01 to 5% based on the dry weight of the feed.

3. A ruminant feed according to claim 1, wherein the N-hydroxymethyl methionine is present in the form of a nontoxic salt thereof.

4. A ruminant feed according to claim 3, wherein the salt is the calcium salt.

5. A ruminant feed according to claim 1 wherein the salt is the sodium, potassium, magnesium or calcium salts.

* * * * *